UNITED STATES PATENT OFFICE 2,371,100

1,3-DICYANOGUANIDINE AND PREPARATION THEREOF

Donald W. Kaiser and Jack T. Thurston, Riverside, Conn., assignors to American Cyanamid Company, New York, N. Y., a corporation of Maine No Drawing. Application February 26, 1944, Serial No. 524,072

12 Claims. (Cl. 260—564)

This invention relates to new organic compounds and their preparation. More particularly, the invention relates to the new compound, 1,3-dicyanoguanidine, and its metal, ammonium, and organic base salts, and methods by which these new compounds are prepared.

We have discovered that salts of dicyandiamide may be caused to react with cyanogen chloride in accordance with the following equations to yield corresponding salts of 1,3-dicyanoguanidine. The equations representing the reactions are illustrated as follows:

$$\text{Me}-\overset{H}{\underset{|}{N}}-\overset{NH}{\underset{\|}{C}}-\text{NHCN} + \text{ClCN} \rightarrow \text{CN}-\overset{H}{\underset{|}{N}}-\overset{NH}{\underset{\|}{C}}-\text{NHCN} + \text{MeCl}$$

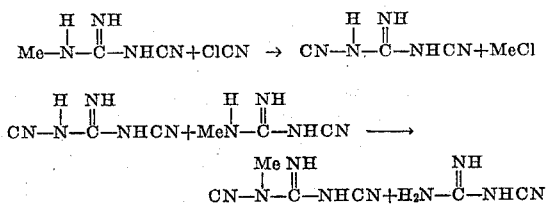

In these equations Me is a salt-forming group, usually an alkali metal or alkaline earth metal radical. As shown above, it is a univalent radical. The free acid, 1,3-dicyanoguanidine, may be liberated by treating its salt with a mineral acid as in the manner shown in the specific examples hereinafter.

In carrying out our reaction, it is not necessary that the various salts of dicyandiamide be isolated before use as starting materials. In fact, we prefer to carry out the reaction by preparing the salt by the reaction of dicyandiamide with an appropriate water-soluble alkali metal or alkaline earth metal hydroxide and then treating the resulting dicyandiamide salt-containing suspension with cyanogen chloride. Accordingly, in a preferred form of our invention we mix together dicyandiamide, an alkali metal or alkaline earth metal hydroxide in a suitable solvent, preferably acetone, and thereafter add cyanogen chloride to the reaction mixture. When potassium hydroxide is used as the alkali metal hydroxide and acetone is employed as the reaction medium, the potassium salt of 1,3-dicyanoguanidine is formed and is insoluble in the reaction medium and is isolated in almost quantitative yields. When other alkalis and other solvents are used, the yields are not as good.

Inasmuch as our preferred method involves the preliminary formation of a dicyandiamide salt, the conditions of the reaction should favor formation of the dicyandiamide salt. This latter reaction takes place in accordance with the following equation:

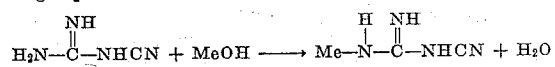

in which Me is a salt-forming group, usually an alkali metal or alkaline earth metal radical. During this preliminary reaction, the amount of water employed is kept at a minimum because of the ease with which dicyandiamide salts are hydrolyzed. In fact, water may be dispensed with entirely when acetone, for example, is employed as solvent, only the water normally present in the alkali and that formed during the reaction being present in the reaction mixture. The preliminary reaction to form the dicyandiamide salt should take place at a temperature of less than about 80° C. to avoid decomposition of the dicyandiamide salt which is formed. Since cyanogen chloride has a boiling point of about 12° C., however, it is usually necessary to cool the reaction mixture below about 10° C. before cyanogen chloride is added thereto. Of course, the reaction with cyanogen chloride will take place at higher temperatures, but the loss of cyanogen chloride through vaporization may make the process uneconomical. Loss of cyanogen chloride can be largely avoided and the reaction carried out at higher temperatures if the reaction is conducted under pressure.

In preparing dicyandiamide salts for use in our new reaction, best yields of the product are obtained when the concentration of the reactants is at a maximum. This is particularly true when water is used as solvent. In general, the amount of water used should be no more than necessary. One way of avoiding excess water is to form a saturated solution of one of the reactants and add the other reactant thereto in undissolved form. When using non-aqueous reaction media, such as acetone, the volume of liquid may be rather large and may even be desirable to facilitate stirring.

As shown in the equation above, one mol of a univalent alkali is employed for each mol of dicyandiamide in preparing salts of dicyandiamide. However, as seen from the equations illustrating the reaction of dicyandiamide salts with cyanogen chloride, two mols of the dicyandiamide salt yield one mol of 1,3-dicyanoguanidine salt and one mol of dicyandiamide. When employing our preferred process, in which the dicyandiamide salt is prepared in suspension and then reacted with cyanogen chloride without isolation, half of the dicyandiamide is reformed. Accordingly, it is preferable to use at least two mols of the alkali for each mol of dicyandiamide in the initial step of the reaction.

It will be understood, of course, that when salts of dicyandiamide are available, we may use these compounds directly in preparing 1,3-dicyanoguanidine. In such case, it is merely necessary to suspend the dicyandiamide salt in a medium, preferably non-aqueous to avoid hydrolysis of the dicyandiamide salt, and treat the suspension with cyanogen chloride. When following this procedure, it is not necessary to observe all of the precautions necessary to prepare salts of dicyandiamide by the process just described. In fact, any dicyandiamide salt prepared by any process other than the one illustrated above may be used as starting material. As will also be obvious, we may use other cyanogen halides, such as cyanogen bromide, or iodide, in place of cyanogen chloride whenever such other cyanogen halides are available.

To liberate the free acid, 1,3-dicyanoguanidine, from its salts, it is merely necessary to add to a saturated solution of the salt a sufficient amount of a strong inorganic acid, such as hydrochloric, sulfuric, nitric, etc., to react with the salt-forming group. The free 1,3-dicyanoguanidine may then be used in solution form when employed as a reactant in the preparation of other chemical compounds.

Various metal, ammonium, and organic base salts of 1,3-dicyanoguanidine may be prepared by either simple neutralization of aqueous or organic solutions of 1,3-dicyanoguanidine or by methods of double decomposition or metathesis from salts of 1,3-dicyanoguanidine. Preparation of typical metal, ammonium, and organic base salts by these different methods is described in the specific examples which follow.

The new compound, 1,3-dicyanoguanidine, is highly reactive and serves as an intermediate in the preparation of other new and useful compounds, some of which can be converted into resins, syntans, dyes, wetting agents, and pharmaceuticals. Some of the metal salts decompose easily on heating and are useful in the production of pyrotechnic compositions.

Our invention will now be described in greater detail by means of the following specific examples, in which 1,3-dicyanoguanidine and representative salts are prepared. All parts are by weight unless otherwise indicated.

EXAMPLE 1

*Mono-potassium 1,3-dicyanoguanidine*

To a stirred suspension of 73.2 g. (0.60 mol) of powdered potassium dicyandiamide in 300 cc. of acetone was slowly added 15.1 cc. (0.30 mol) of cyanogen chloride at 5–10° C. The resulting reaction was strongly exothermic. After the mixture had warmed to room temperature, the solid was filtered and washed well with acetone. The acetone filtrate was yellow in color and slightly alkaline in reaction. The light yellow solid crystallized from hot water to give dense, nearly colorless crystals which decomposed when heated at 290–291° C. After further recrystallization, colorless, heavy needlelike crystals were obtained, which had a decomposition point of about 293–294° C. The product, the mono-potassium salt of 1,3-dicyanoguanidine, was quite stable. It was soluble in water to give solutions having a very slightly alkaline reaction; it was slightly soluble in ethyl alcohol and insoluble in acetone and ethyl acetate.

EXAMPLE 2

*Mono-sodium 1,3-dicyanoguanidine*

The sodium salt of 1,3-dicyanoguanidine may be prepared in exactly the same way from sodium dicyandiamide. In physical appearance, the sodium salt is very similar to the potassium salt. It is, however, much more soluble in water and is difficult to isolate therefrom. Sodium-1,3-dicyanoguanidine has a decomposition temperature of about 303° C.

EXAMPLE 3

*Mono-potassium 1,3-dicyanoguanidine*

A mixture of 2520 g. (30 mols) of dicyandiamide and 5.0 gals. of acetone was placed in a reaction vessel which was surrounded by an ice-brine bath. After cooling to 10° C., 4082 g. (62 mols) of 85% potassium hydroxide pellets was added, the mixture stirred for ½ hour and then cooled to 0° C. Cyanogen chloride (1570 cc., representing 30 mols) was then added at such a rate that the temperature of the reaction mixture did not exceed 8° C. After the first 400 cc. of cyanogen chloride had been added, stirring was stopped, and some adhered pellets of potassium hydroxide on the bottom of the reaction vessel were broken loose. Stirring was then resumed, and the remaining quantity of cyanogen chloride added slowly. After addition of all of the cyanogen chloride, stirring was continued for about one hour, at which time the product was a fine cream. Addition of 250 cc. of glacial acidic acid produced an acid reaction. The solid was filtered and washed with a gallon of acetone. The product was a nearly colorless powder, weighing when dried 6617 g., which represented an almost quantitative yield, calculated as potassium dicyanoguanidine and potassium chloride. Recrystallization of the material from water gave the potassium salt of 1,3-dicyanoguanidine having the properties described in Example 1.

EXAMPLE 4

*1,3-dicyanoguanidine*

After dissolving 468 g. (2.0 mol) of 94% potassium 1,3-dicyanoguanidine in a liter of boiling water, the solution was clarified with "Norite," filtered, and cooled in an ice bath. When colorless crystals of the potassium salt began to appear in the light yellow solution, 200 g. (2.0 mols) of concentrated hydrochloride acid which had been diluted with 250 cc. of water was added. The yellow color disappeared, and the crystallized salt dissolved. Within a short time colorless needles of hydrated 1,3-dicyanoguanidine separated. The mixture was well cooled, the solid filtered and vacuum dried in a desiccater. The free acid so prepared was unstable on prolonged standing and decomposed violently and erratically when heated between 130 and 135° C. The free acid occurs in the form of colorless, needlelike crystals which are easily soluble in water to give a strongly acid solution. The compound is also soluble in acetone, ethyl acetate, and ethanol.

Example 5

Cupric 1,3-dicyanoguanidine

A solution of 117 g. (0.5 mol) of 94% potassium 1,3-dicyanoguanidine, which contained a molar equivalent of potassium chloride in 300 cc. of hot water was prepared, clarified with "Norite," and filtered. A second solution of 62½ g. (0.25 mol) of cupic sulfate pentahydrate in 250 cc. of warm water was prepared and added to the first solution. The light emerald green, amorphous-appearing precipitate which formed was filtered, washed with water and acetone, and air dried. A quantitative yield of cupric 1,3-dicyanoguanidine was obtained. When heated, the salt changed to a brownish-gray color at 226° C. without melting.

Example 6

Ferrous 1,3-dicyanoguanidine

After dissolving 147 g. (1.0 mol) of potassium 1,3-dicyanoguanidine, which had been twice recrystallized from hot water to remove potassium chloride, in 300 cc. of hot water, the solution was cooled in an ice bath to room temperature, and a solution containing 0.60 mol of ferrous sulfate heptahydrate in 300 cc. of water was added. The resulting clear, light brown solution was allowed to stand in an ice bath, and within a short time nearly colorless crystals began to separate. After standing for an hour, the granular, very light green crystals of ferrous 1,3-dicyanoguanidine were filtered, washed with water, and air dried. The yield of salt was above theory, indicating hydrate formation. After drying in an oven at 100° C., the weight of the crystals dropped to 125 g., which represented a yield of 92% of theoretical. The product now had a light cream color. When heated, it turned dark brown but did not fuse below 300° C.

Example 7

Ferric 1,3-dicyanoguanidine

The above experiment was repeated using ferric chloride in place of ferrous sulfate. Upon addition of the ferric chloride to the solution of potassium 1,3-dicyanoguanidine, the solution turned to a deep blood-red color similar to that of a solution of ferric thiocyanate. The product was extremely water soluble.

Example 8

Cobaltous 1,3-dicyanoguanidine

A solution of 87.3 g. (0.30 mol) of cobaltous nitrate hexahydrate was poured into a warm solution of 73.5 g. (0.5 mol) of potassium 1,3-dicyanoguanidine. A solution having a deep violet color resulted. This solution was placed in an ice bath, and within a short time dense violet crystals began to separate. The salt was filtered, washed with water and acetone, and air dried. The product, when dry, was pink in color. It did not melt when heated up to a temperature of 300° C., although it did turn to a dark violet color.

Example 9

Nickel 1,3-dicyanoguanidine

When a solution of 73.5 g. (0.5 mol) of potassium 1,3-dicyanoguanidine in 150 cc. of warm water was added to a solution of 53.1 g. (0.30 mol) of nickel acetate in 150 cc. of water, an intensification of the green nickel color occurred. After standing overnight, a thin layer of dense, dark green crystals was found on the sides and bottom of the flask. The crystals of nickel 1,3-dicyanoguanidine did not fuse below 300° C.

Example 10

Zinc 1,3-dicyanoguanidine

Finely divided, colorless, granular solid immediately precipitated when a solution of 33 g. (0.15 mol) of zinc acetate dihydrate in 100 cc. of water was added to a solution of 29.4 g. (0.20 mol) of potassium 1,3-dicyanoguanidine in 75 cc. of warm water. The filtered, water washed, and dried salt was recovered in a 98.5% yield. When heated to 300° C., it turned yellow in color but did not melt.

Example 11

Mercuric 1,3-dicyanoguanidine

After dissolving 14.7 g. of potassium 1,3-dicyanoguanidine in 200 cc. of warm water, a solution of 17.55 g. of mercuric acetate in 100 cc. of water was added. A dense, colorless precipitate formed which was filtered, washed with water, and dried in an oven at 50° C. The salt became slightly yellow when heated to 300° C. but did not melt.

Example 12

Silver 1,3-dicyanoguanidine

A bulky, colorless precipitate formed on mixing a solution of 18.7 g. of silver nitrate in 100 cc. of water with a solution of 14.7 g. of potassium 1,3-dicyanoguanidine in 300 cc. of water. The product was filtered, washed, and dried in an oven at 50° C. When heated, the silver 1,3-dicyanoguanidine decomposed at 285° C.

Example 13

Cyanomethylammonium 1,3-dicyanoguanidine

A hot solution of 40.5 g. of 81.5% 1,3-dicyanoguanidine in 300 cc. of ethyl acetate was filtered from insoluble salts, cooled in an ice bath, and 17.7 g. of 95% glycinonitrile (freshly distilled) slowly added. A gummy oil soon separated and on stirring it solidified. The solid was filtered, washed well with ethyl acetate and air dried. When heated, the light pink solid decomposed at about 108–109° C.

Example 14

Ammonium 1,3-dicyanoguanidine

After warming 36.3 g. of 79.4% 1,3-dicyanoguanidine with 150 cc. of acetone, the insolubles were filtered, and 18.3 g. of 28% aqueous ammonia was slowly added to the acetone filtrate. The mixture became warm, and a colorless solid deposited. The amorphous-appearing salt was filtered, washed with acetone, and air dried. When heated, the product decomposed rather violently at 210° C. The salt was extremely water soluble and fairly soluble in methanol. When treated with copper sulfate, the characteristic green, copper salt of 1,3-dicyanoguanidine was precipitated.

Example 15

Cyclohexylammonium 1,3-dicyanoguanidine

A solution of 32.7 g. of 1,3-dicyanoguanidine in 250 cc. of warm acetone was prepared. An appreciable quantity of insoluble material (polymerized free acid) was removed by filtration, and 29.7 g. of cyclohexylamine was slowly added. The solution became quite warm, and solid separated. A filtered acetone solution of 1,3-dicyanoguanidine was then added in sufficient amount to destroy the basicity of the excess amine and produce a neutral mixture. After filtration, the salt was washed with acetone and allowed to dry. After further purification by recrystallization from water, minute colorless plates of cyclohexylammonium 1,3-dicyanoguanidine were obtained. The product decomposed when heated at 175–176° C.

EXAMPLE 16

Guanidine 1,3-dicyanoguanidine

A filtered solution of 32.7 g. of 1,3-dicyanoguanidine in 250 cc. of acetone was treated with 29.7 g. of guanidine carbonate, and 250 cc. of water added to facilitate reaction. After evaporating the solution to dryness, the solid was extracted with methanol and the solution filtered and again evaporated to dryness. A sample of the crude product decomposed at a temperature of 128–130° C. The salt was dissolved in hot ethanol, the solvent partially removed by evaporation, and colorless plates filtered from the syrupy liquid. The crystals were then washed with ethanol and acetone and air dried. The product, guanidine 1,3-dicyanoguanidine, thus obtained melted at 144–145° C. The salt was very water soluble and precipitated cupric 1,3-dicyanoguanidine upon addition of copper sulfate solution.

What we claim is:

1. Compounds of the group consisting of 1,3-dicyanoguanidine and salts of 1,3-dicyanoguanidine.

2. 1,3-dicyanoguanidine.

3. Potassium 1,3-dicyanoguanidine.

4. Sodium 1,3-dicyanoguanidine.

5. A method of preparing 1,3-dicyanoguanidine which comprises the steps of treating a suspension of a dicyandiamide salt with cyanogen chloride and thereafter neutralizing the resulting 1,3-dicyanoguanidine salt with a mineral acid, whereby 1,3-dicyanoguanidine is formed.

6. A method of preparing 1,3-dicyanoguanidine which comprises the steps of mixing together dicyandiamide and a compound of the group consisting of water-soluble, alkali metal hydroxides and water-soluble, alkaline earth metal hydroxides, adding thereto cyanogen chloride, and thereafter treating the resulting salt of 1,3-dicyanoguanidine with a mineral acid to liberate 1,3-dicyanoguanidine.

7. A method of preparing 1,3-dicyanoguanidine which comprises the steps of mixing together dicyandiamide and a compound of the group consisting of water-soluble, alkali metal hydroxides and water-soluble, alkaline earth metal hydroxides in acetone, adding thereto cyanogen chloride, and thereafter treating the resulting salt of 1,3-dicyanoguanidine with a mineral acid to liberate 1,3-dicyanoguanidine.

8. A method of preparing 1,3-dicyanoguanidine which comprises the steps of adding cyanogen chloride to a suspension of potassium dicyandiamide in acetone and thereafter acidifying the resulting potassium 1,3-dicyanoguanidine with an acid to produce 1,3-dicyanoguanidine.

9. A method of producing potassium 1,3-dicyanoguanidine which comprises the step of adding cyanogen chloride to a suspension of potassium dicyandiamide in acetone.

10. A method of preparing salts of 1,3-dicyanoguanidine which comprises the step of adding cyanogen chloride to a suspension of a dicyandiamide salt.

11. A method of preparing alkali metal salts of 1,3-dicyanoguanidine which comprises adding cyanogen chloride to a suspension of an alkali metal dicyandiamide in acetone at temperatures not in excess of about 10° C.

12. In a process of preparing 1,3-dicyanoguanidine the step which comprises adding a cyanogen halide to a suspension of a dicyandiamide salt in acetone.

DONALD W. KAISER.
JACK T. THURSTON.